W. G. STERLING.
Odometer.
No. 11,703. Patented Sept. 19, 1854.
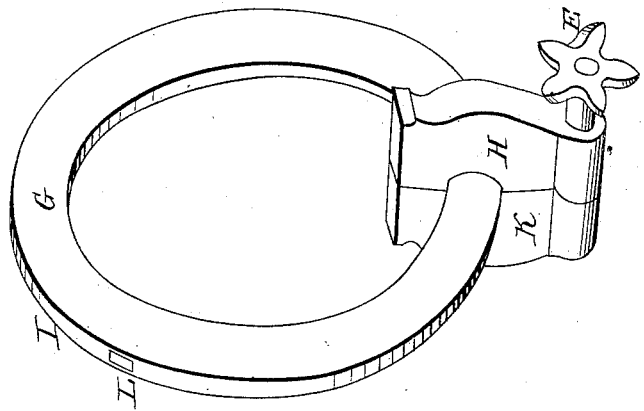
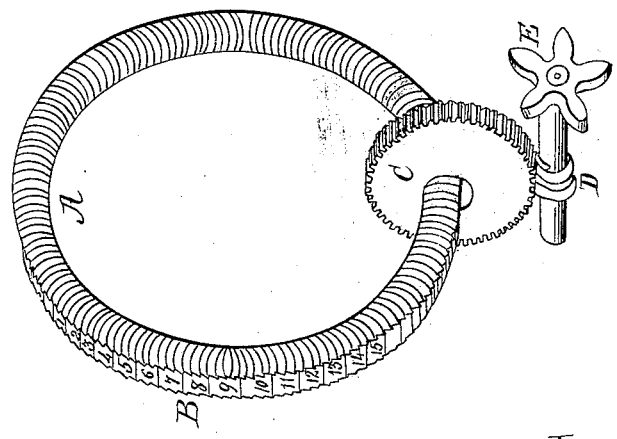
Witnesses
Stephen J Stevens
C. C. Sterling
Inventor
W. G. Sterling

UNITED STATES PATENT OFFICE.

W. G. STERLING, OF BRIDGEPORT, CONNECTICUT.

COUNTING-MACHINE AND MACHINE FOR INDICATING MOTION.

Specification of Letters Patent No. 11,703, dated September 19, 1854.

*To all whom it may concern:*

Be it known that I, W. G. STERLING, of Bridgeport, Fairfield County, State of Connecticut, have invented an Apparatus for Measuring Distances, to be Attached to Carriages, Wagons, and other Vehicles.

The following is a full and correct description of my invention, reference to be had to the drawing annexed, which forms a part of this specification.

Figure 1 letter A is a metal ring half an inch in size, and about five inches in diameter, around which is cut the thread of a screw so that the ring makes an endless screw, the threads on the outer surface of the ring are cut off sufficiently to make a plain surface on the outside of the ring, and yet not enough to impair the thread of the screw from working. On this plain surface are made figures which are graduated by the size of the carriage wheel to indicate the distance the carriage travels, as shown at Fig. 1 letter B. On this ring is placed the small cog wheel C about two inches in diameter, having a female screw cut in its center to fit the screw on the ring. This cog wheel C, is acted on by the thread of the screw on the small shaft D, which works in the cogs on the edge of this wheel. On the other end of this shaft D is a small five toothed cog wheel E which is operated on by a pin or an eccentric hereafter described.

Fig. 2, is a metal case which is adapted to contain the apparatus, and keep it in its place. This case is cast in two parts, one containing the front part G H, and the other the back part I K, and are firmly secured together. The small five toothed wheel E projects outside the case. Near the top of the case on the periphery is an opening about an inch long, through this the figures on the screw ring (as they come under the opening) can be seen as shown Fig. 2 letter L.

This apparatus can be secured to a carriage in various ways, it can be embedded in the hub of the carriage wheel, and a pin on the axle operate on the cog wheel as it revolves. Or it can be more easily attached by passing the axle through the ring and screw the same near the hub of the carriage wheel, so that a small pin driven into the back face of the hub of the wheel will turn the five toothed cog wheel one tooth, or cog, at each revolution of the carriage wheel.

I do not claim the revolution of a ring by means of cogs working in a screw, a spiral commonly termed a tangent screw; but

What I claim as my invention is—

The combination of the revolving endless screw marked with figures on its surface as above described, with the stationary toothed nut with a female screw in its center, fitting the screw on the revolving ring in the manner set forth for the purpose of causing the revolution of said ring as above specified.

Bridgeport Nov 12th 1853

W. G. STERLING.

Witnesses:
STEPHEN S. STEVENS,
C. E. STERLING.